No. 719,522. PATENTED FEB. 3, 1903.
R. A., M. & A. W. SLATER.
PIPE HEATING AND WELDING APPARATUS.
APPLICATION FILED DEC. 31, 1901.
NO MODEL. 3 SHEETS—SHEET 1.

WITNESSES:
James O'Neil
Roy McIntire

INVENTORS
Robert A. Slater
Mathias Slater
and Adam W. Slater
BY
Connolley Bros.
ATTORNEYS No. 719,522. PATENTED FEB. 3, 1903.
R. A., M. & A. W. SLATER.
PIPE HEATING AND WELDING APPARATUS.
APPLICATION FILED DEC. 31, 1901.
NO MODEL. 3 SHEETS—SHEET 2.

WITNESSES:
Jameson Neil
Roy McIntire

INVENTORS
Robert A. Slater
Mathias Slater
and Adam W. Slater
BY
Connolly Bros.
ATTORNEYS.

No. 719,522. PATENTED FEB. 3, 1903.
R. A., M. & A. W. SLATER.
PIPE HEATING AND WELDING APPARATUS.
APPLICATION FILED DEC. 31, 1901.
NO MODEL. 3 SHEETS—SHEET 3.

WITNESSES:
James O'Neil
Roy McIntire

INVENTORS
Robert A. Slater
Mathias Slater
and Adam W. Slater
BY Connelly Bros.
ATTORNEYS

UNITED STATES PATENT OFFICE.

ROBERT A. SLATER, MATHIAS SLATER, AND ADAM W. SLATER, OF McKEESPORT, PENNSYLVANIA.

PIPE HEATING AND WELDING APPARATUS.

SPECIFICATION forming part of Letters Patent No. 719,522, dated February 3, 1903.

Application filed December 31, 1901. Serial No. 87,982. (No model.)

*To all whom it may concern:*

Be it known that we, ROBERT A. SLATER, MATHIAS SLATER, and ADAM W. SLATER, citizens of the United States, residing at McKeesport, in the county of Allegheny and State of Pennsylvania, have invented certain new and useful Improvements in Pipe Heating and Welding Apparatus; and we do hereby declare the following to be a full, clear, and exact description of the invention, such as will enable others skilled in the art to which it appertains to make and use the same.

Our invention has relation to the manufacture of straight weld tubing, and has for its object the provision of novel means for heating and welding the edges of the bent plate whereby the operations will be performed with more expedition and under less expense than with the methods and means now employed.

In the manufacture of straight lap-weld tubing it is customary after the plate or skelp from which the tube is to be formed has been bent to the required shape to heat the entire tube in a furnace to a welding heat. The tube is then welded and afterward sent to a reheating-furnace and after being again heated is trued up to the desired cylindrical shape. This process is a slow and cumbersome one, entailing much loss of time and expenditure of fuel in heating the entire tube and is open to many other objections and disadvantages, which it is the purpose of our invention to obviate.

Our invention contemplates the provision of means whereby only so much of the tube on either side of the seam as is necessary for complete welding is heated and whereby the welding-hammers, of which any desired number may be employed, are caused to travel lengthwise of and over the tube while the latter remains stationary and are operated at a very high rate of speed, thus performing their work with great rapidity and exactness.

Figure 1:
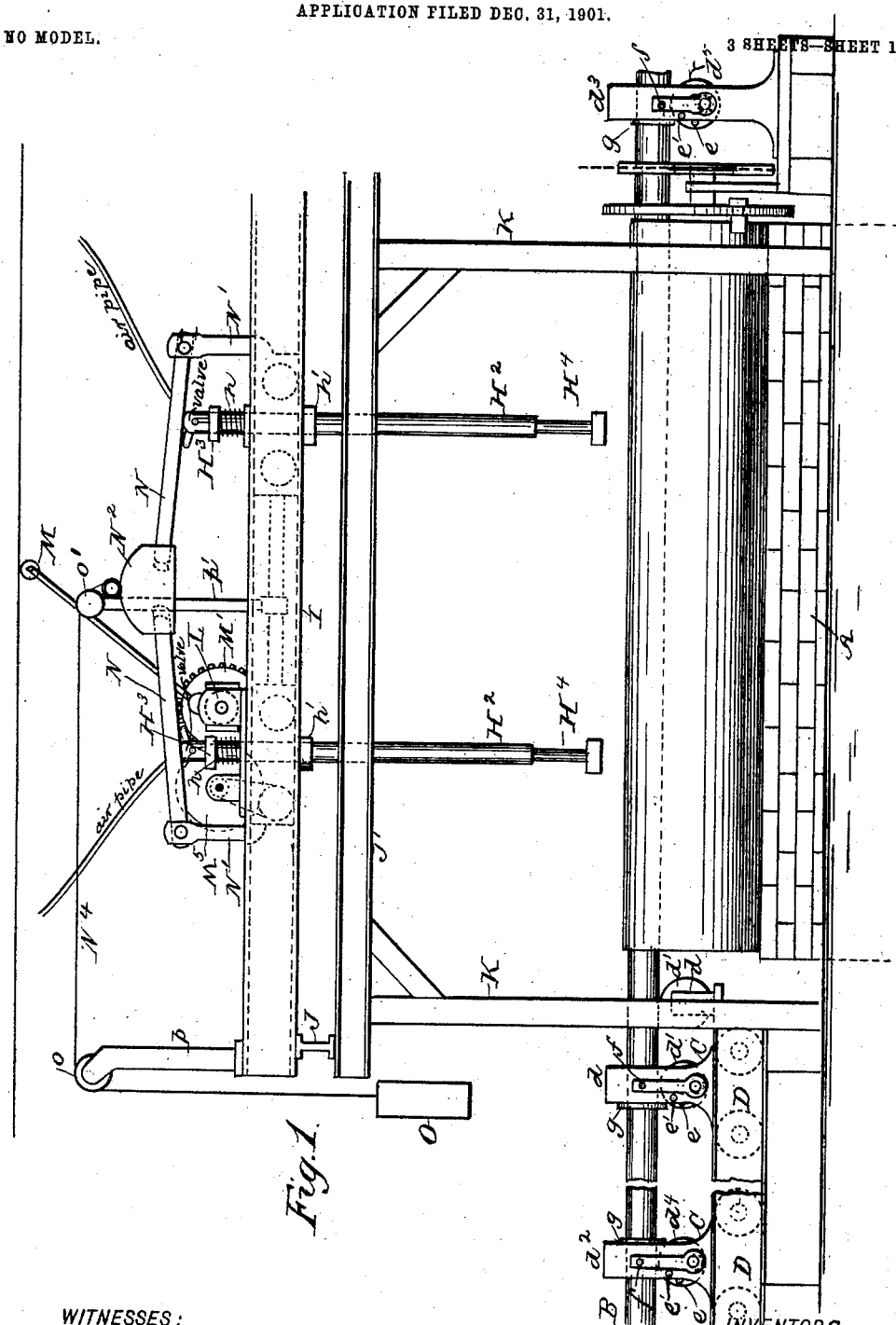
Figure 2:
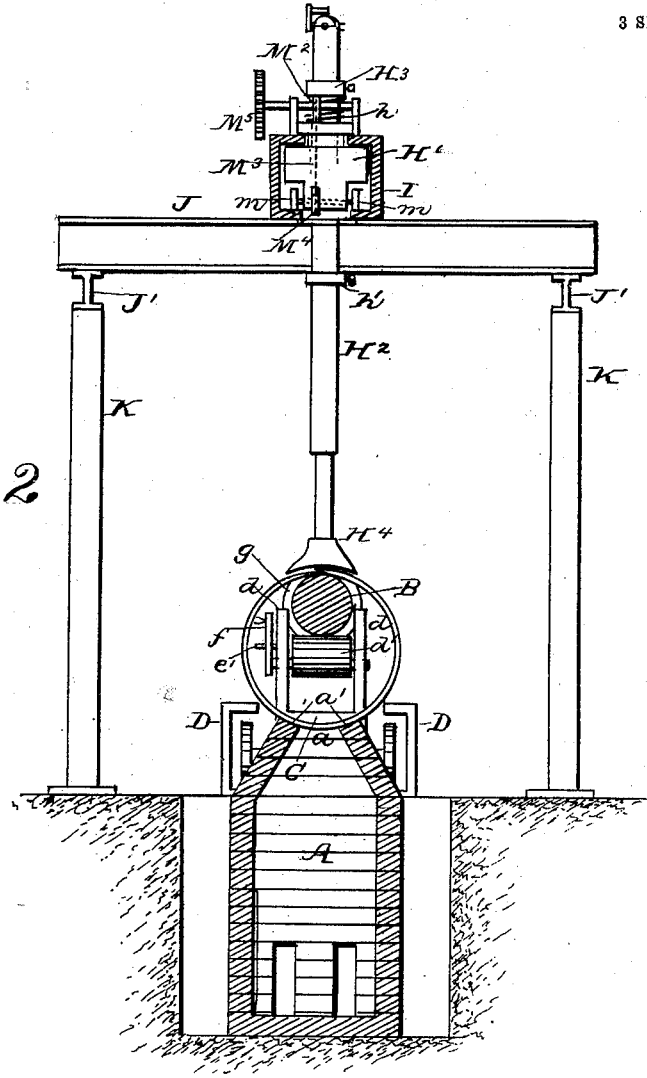
Figure 3:
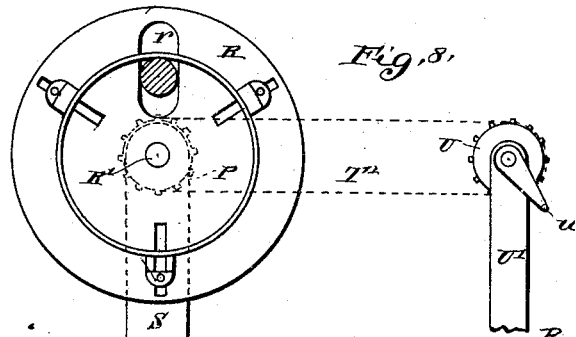
Figure 3:
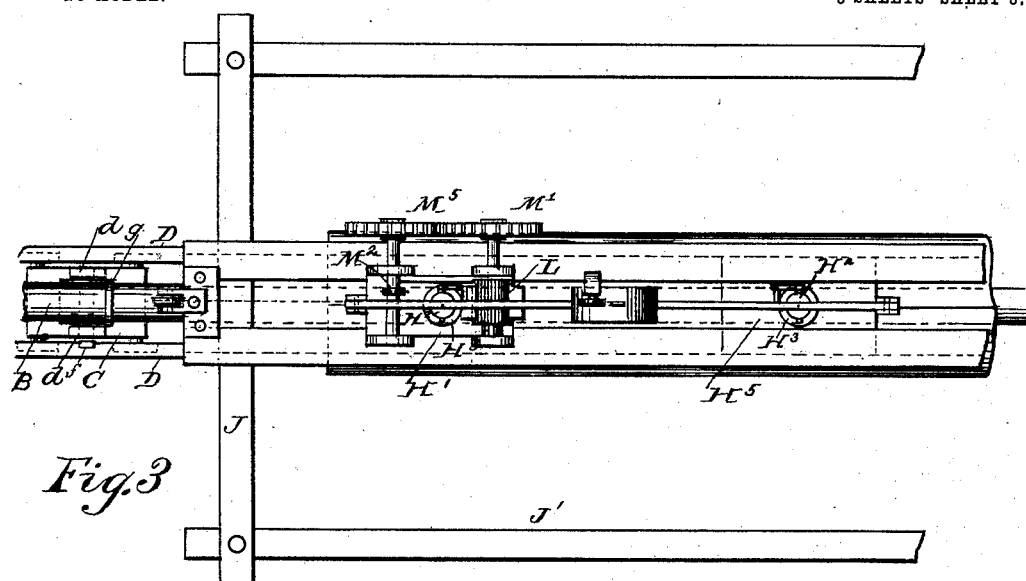
Figure 4:
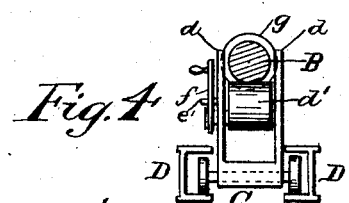
Figure 5:
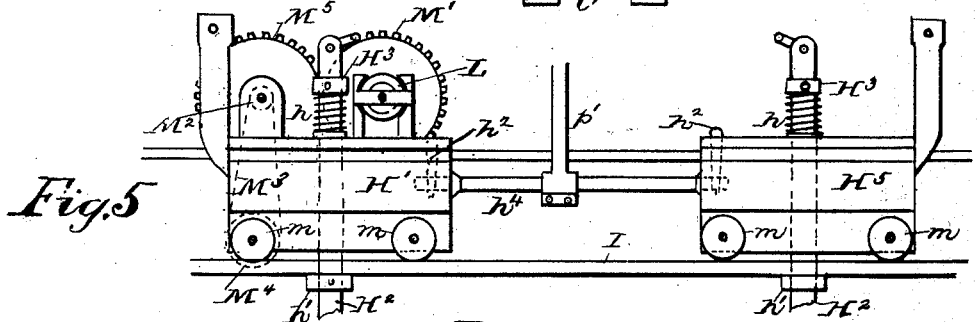
Figure 6:
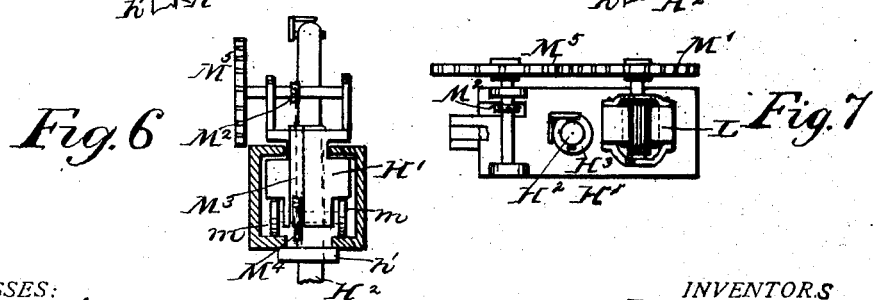
Figure 7:
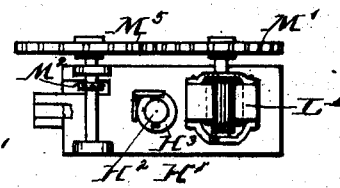

In the accompanying drawings, Figure 1 is a side elevation of the tube heating and welding apparatus embodying our invention. Fig. 2 is a vertical transverse section of the same. Fig. 3 is a plan view, and Figs. 4, 5, 6, and 7 detail views. Fig. 8 is an end view of a portion of the apparatus, illustrating mechanism for reversing the tube.

A prominent and essential feature of our invention is the heating-furnace A, which consists of a structure of any suitable material built in a pit below the floor-line of the mill and having a narrow opening $a$ in its top running lengthwise of the furnace. The walls of the furnace converge toward this opening and are beveled at $a'$, thus forming a seat for the tube, which rests on the top of the furnace over this opening while being heated. The furnace is sufficiently long to accommodate the longest tubes and is of any suitable or desirable width and height.

The purpose of the furnace constructed as described and shown is to heat the tube on either side of the seam, the width of the opening in the top of the furnace being sufficient to allow the flame to strike the tube two or three inches on each side of the seam, while the balance of the tube is beyond reach of the flame and is therefore not heated. When the tube has been sufficiently heated, it is turned over, so as to bring the seam with its overlapping edges uppermost, and a mandrel being passed through it to serve as an anvil the welding-hammers are brought into requisition.

B designates the mandrel, which is supported outside the tube by the carriages C C, mounted on wheels and running in guides D D. The carriages C C have uprights or standards $d\ d$, between which are journaled eccentrics $d'\ d'$, on which the mandrel B rests and which are adjustable, so that the mandrel may be raised and lowered to accommodate it to tubes of different diameters. The eccentrics are provided with holes $e\ e$ for the reception of pins $e'\ e'$, which are inserted through holes in the standards $d\ d$ and serve to lock the eccentrics in position. The eccentrics are turned by means of cranks or crank-levers $f\ f$, keyed to their shafts. Any other suitable appliances may be used for turning and locking the eccentrics.

Collars $g\ g$, attached to the mandrel, abut against the standards $d\ d$ on opposite sides and prevent longitudinal play of the mandrel when not desired—that is, when the tube is being welded. In addition to the standards $d\ d$, with their eccentrics, supplementary standards $d^2\ d^3$ and eccentrics $d^4\ d^5$ may be employed to support the mandrel at any point where it might be liable to sag, the standard $d^3$ being, as shown, located under the end of the mandrel projecting from the end of the tube.

The welding-hammers are of the pneumatic type and are shown at $H^4\ H^4$. The cylinders of the hammers are supported by carriages $H'\ H^5$, mounted on wheels and arranged to move between the sides and flanges of the channel-iron beams I, which are bolted to the cross-ties J J of the frame J', erected on pillars K K, so that the carriages $H'\ H^5$ will travel directly over and lengthwise of the tube while the latter is being welded. The pneumatic hammers may be of any of the well-known types now in use. They are arranged vertically over the center of the tube and their plungers terminate at their lower ends in suitably-shaped heads, curved laterally to fit the curve of the tube. When not in actual operation, the hammers are supported with their heads a short distance above the tube by springs $h$, surrounding the barrels or cylinders $H^2\ H^2$ and located between the tops of the beams I and the collars $H^3$. Stops $h'$ on the barrels $H^2$ prevent the hammers from being raised too high by the springs. As it is intended that the hammers shall move automatically lengthwise of the tube while the work progresses one of the carriages upon which the hammers are mounted is constructed as a motor-carriage and for such purpose has mounted on it a suitable electric motor L, which receives its supply of current from an overhead conductor by means of a trolley M. The armature-shaft of the motor carries a toothed wheel M', which meshes with a similar wheel $M^5$ on the carriage, on the shaft of which is mounted the sprocket-wheel $M^2$, connected by chain $M^3$ with a sprocket $M^4$ on the axle of the traction-wheels $m\ m$. The motor-carriage H' is coupled to the trailer $H^5$ by a detachable space-bar $h^4$, secured to the two carriages by keys $h^2$.

To depress the hammers for operation, the devices shown in Figs. 1 and 3 are employed. Two toggle-levers N N are pivoted at their outer ends to standards N' N' at the ends of the carriages H' $H^5$ and have their inner ends loosely socketed in a weight $N^2$, which tends to depress the levers, and as the latter rest on the tops of the hammers tends also to depress the latter. This weight is, however, connected by a rope, chain, or cable $N^4$ with a counterpoise-weight O, and said rope or cable runs over the pulleys $o\ o'$ to said counterpoise. One of these pulleys $o'$ is mounted on a stationary standard or bracket $p$, attached to the framing of the apparatus, while the pulley $o$ is mounted on a pillar $p'$, clamped to the space-bar $h^4$. The counterpoise-weight when hanging down draws the weight $N^2$ upward, lifting the levers N N and allowing the hammers to rise, so that the tube may be handled. When, however, the tube is in position for welding, the counterpoise O is raised, allowing the weight N to descend and causing the levers N N to press the hammers down to their work. The levers N are in contact with the air-supply valves of the hammers, and in pressing the hammers down open the air-valves, so as to start the hammers in immediate operation. When the levers N N rise, the air-valves automatically close, the pressure thereon being sufficiently relieved.

In Fig. 8 of the drawings we have shown the mechanism for turning the pipe to reverse the position of the seam or lap after the pipe has been heated. This mechanism consists of a three-jawed chuck R, mounted on a suitable shaft R', which is journaled in a standard S. Upon the shaft R' is also mounted a sprocket-wheel P, over which passes an endless chain T', which passes around a sprocket-wheel U, supported on a standard U' and provided with a crank $u$. The chuck R is formed with a radial slot $r$ for the passage of the mandrel, which latter is placed in position in the pipe and passed through the slot $r$ after the pipe has been turned to bring the seam or lap uppermost.

Having described our invention, what we claim as new, and desire to secure by Letters Patent, is—

1. In apparatus for the manufacture of welded tubing from skelp, the combination of a stationary furnace, constructed and adapted to heat the tube its entire length at one time, on both sides of the seam or lap, while the tube is supported above the furnace, means for reversing the position of the tube when heated, a mandrel supported horizontally above and lengthwise of the furnace, and one or more automatic welding-hammers arranged above and adapted to travel lengthwise of the tube.

2. In apparatus for the manufacture of welded tubing, the combination with a furnace having a longitudinal opening in the top and means for supporting the tube above the same and limiting the application of heat to the joint or seam, of one or more automatically-operated welding-hammers movable lengthwise of the tube, when the latter is heated by and reversed in position above the furnace, means for moving said hammers lengthwise of the tube, and a mandrel arranged and supported horizontally above the furnace.

3. In apparatus for the manufacture of lap-welded tubing, the combination with a suitable mandrel mounted on movable supports and arranged horizontally above the heating-furnace and adapted to be inserted in the tube to be operated on and serve as a welding-anvil, of means for heating the edges of the skelp, after the same is bent to tubular form, without heating the body of the tube, means for supporting the tube while being heated, one or more automatic, rapidly-reciprocating welding-hammers, arranged above and adapted to travel lengthwise of the tube during the welding operation, and means for feeding or causing a progressive movement of said hammers.

4. In apparatus for the manufacture of lap-welded tubing, the combination with tube heating and supporting appliances and a suitable blow-resisting mandrel, of one or more pneumatic seam-welding hammers, one or more traveling carriages, mounted on ways above the heating-furnace, an electromagnetic motor mounted on one of the carriages and arranged to propel the same, and mechanism for raising and lowering the hammers.

5. In an apparatus for welding pipe the combination of a furnace arranged and adapted to heat the pipe in the vicinity of the seam or lap and a suitable mandrel, the pneumatic welding-hammers, the carriages or trucks from which the hammers depend, the springs for lifting the hammers, the weighted toggle-levers, resting on said hammers, and the counterpoise-weight, chain or cable connection and the pulleys over which the latter passes, substantially as described.

6. A pipe heating and welding apparatus, comprising a furnace arranged and adapted to heat the pipe in the neighborhood of the seam or joint, without heating the body of the pipe, a suitably-supported mandrel arranged horizontally above the furnace, means for turning the pipe to reverse the position of the seam or lap, and means for welding the lap while the pipe remains stationary, said welding means consisting of automatic hammers arranged and adapted to deliver blows in rapid succession, and trucks or carriages supporting said hammers and automatically movable lengthwise of the tube.

In testimony whereof we affix our signatures in presence of two witnesses.

ROBERT A. SLATER.
MATHIAS SLATER.
ADAM W. SLATER.

Witnesses:
MARY M. HEDDEN,
THOS. A. CONNOLLY.